(12) United States Patent
Faddoul et al.

(10) Patent No.: US 8,954,357 B2
(45) Date of Patent: Feb. 10, 2015

(54) MULTI-TASK MACHINE LEARNING USING FEATURES BAGGING AND LOCAL RELATEDNESS IN THE INSTANCE SPACE

(75) Inventors: Jean-Baptiste Faddoul, Grenoble (FR); Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 658 days.

(21) Appl. No.: 13/106,105

(22) Filed: May 12, 2011

(65) Prior Publication Data

US 2012/0290510 A1 Nov. 15, 2012

(51) Int. Cl.
*G06F 15/18* (2006.01)
*G06N 99/00* (2010.01)

(52) U.S. Cl.
CPC .................................. *G06N 99/005* (2013.01)
USPC .......................................................... 706/12

(58) Field of Classification Search
CPC ....... G06N 7/005; G06N 3/006; G06N 3/126; G06N 7/02; G06N 99/005
See application file for complete search history.

(56) References Cited

U.S. PATENT DOCUMENTS

2008/0270329 A1* 10/2008 Long et al. ...................... 706/12

OTHER PUBLICATIONS

Chawla et al., "Distributed Learning with Bagging-Like Performance", Sep. 3, 2002, PATREC, pp. 1-17.*
Dietterich, "An Experimental Comparison of Three Methods for Constructing Ensembles of Decision Trees: Bagging, Boosting, and Ranomization", 2000, Machine learning, 40, pp. 139-157.*
Polikar, "Ensemble Based Systems in Decision Making", Aug. 2006, Circuits and Systems Magazine, pp. 21-45.*
Bay. "Combining nearest neighbor classifiers through multiple feature subsets," In Proc. 17th Intl. Conf. on Machine Learning, pp. 37-45, 1998.
Bekkerman, et al. "Automatic categorization of email into folders: Bench-mark experiments on enron and sri corpora," in Technical Report, Computer Science department, IR-418, pp. 4-6, Apr. 2005.
Breiman. "Bagging predictors," Machine Learning, 24(2):123-140, Aug. 1996.
Breiman,et al. "Random forests," in Machine Learning, vol. 45, pp. 5-32, 2001.
Caruana. "Multitask learning," in Machine Learning, vol. 28, pp. 41-75, 1997.
Chapelle, et al. "Multi-task learning for boosting with application to web search ranking," in KDD '10: Proceedings of the 16th ACM SIGKDD international conference on Knowledge discovery and data mining, pp. 1189-1198, 2010.
Dai, et al. "Boosting for transfer learning," in ICML '07: Proceedings of the 24th international conference on Machine learning, pp. 193-200, 2007.

(Continued)

*Primary Examiner* — Gaffin Jeffrey
*Assistant Examiner* — Paulinho E Smith
(74) *Attorney, Agent, or Firm* — Fay Sharpe LLP

(57) ABSTRACT

A multi-task machine learning component learns a set of tasks comprising two or more different tasks based on a set of examples. The examples are represented by features of a set of features. The multi-task machine learning component comprises a digital processing device configured to learn an ensemble of base rules wherein each base rule is learned for a sub-set of the set of features and comprises a multi-task decision tree (MT-DT) having nodes comprising decision rules for tasks of the set of tasks. An inference component comprises a digital processing device configured to predict a result for at least one task of the set of tasks for an input item represented by features of the set of features using the learned ensemble of base rules.

10 Claims, 3 Drawing Sheets

(56) References Cited

OTHER PUBLICATIONS

Evgeniou, et al. "Regularized multi-task learning," in KDD '04: Proceedings of the tenth ACM SIGKDD International conference on Knowledge discovery and data mining, pp. 109-117. ACM, 2004.

Zheng, et al. "Transferring multi-device localization models using latent multi-task learning," in AAAI'08: Proceedings of the 23rd national conference on Artificial intelligence, pp. 1427-1432, AAAI Press, 2008.

Faddoul, et al. "Boosting multi-task weak learners with applications to textual and social data," in International Conference on Machine Learning and Applications, ICMLA 2010, Dec. 12-14, 2010, pp. 367-372.

Freund, et al. "A short introduction to boosting," Japanese Society for Artificial Intelligence, 14(5):771-780, 1999.

Freund, et al. "Experiments with a new boosting algorithm," in ICML'96: Proceedings of the 13th International Conference on Machine Learning, pp. 148-156, 1996.

Hovelynck, et al. "Multimodality in one-class classification," in WWW '10: Proceedings of the 19th international conference on World wide web, pp. 441-450, 2010.

Kong, et al. "Error correcting output coding corrects bias and variance," in Proceedings of the Twelfth International Conference on Machine Learning, pp. 313-321, 1995.

Kuncheva, et al. "Measures of diversity in classifier ensembles and their relationship with the ensemble accuracy," Mach. Learn., 51(2):181-207, May 2003.

Lewis, et al. "Building a test collection for complex document information processing," in ACM SIGIR'06: Proceedings of the 29th Annual International ACM Conference on Research and Development in Information Retrieval, pp. 665-666, 2006.

Liu, et al. "Semi-supervised multitask learning," IEEE Transactions on Pattern Analysis and Machine Intelligence, 31(6):1074-1086, 2009.

McCallum, et al. "Topic and role discovery in social networks with experiments on enron and academic email," J. Artif. Int. Res., 30(1):249-272, 2007.

Quinlan. "Induction of decision trees," Mach. Learn, pp. 81-106, 1986.

Renders, et al. "Categorization in multiple category systems," In ICML'06: Proceedings of the 23rd International Conference on Machine Learning, pp. 745-752, 2006.

Schapire, et al. Improved boosting algorithms using confidence-rated predictions, Machine Learning, 37(3):297-336, Dec. 1999.

Shetty. "Discovering important nodes through graph entropy: The case of enron email database," in KDD, Proceedings of the 3rd international workshop on Link discovery, pp. 74-81, 2005.

Turner, et al. "Classifier combining: Analytical results and implications," in Proceedings of the AAAI-96 Workshop on Integrating Multiple Learned Models for Improving and Scaling Machine Learning Algorithms, pp. 126-132, 1995.

Wang, et al. "Boosted multi-task learning for face verification with applications to web image and video search," in CVPR'09: Proceedings of the 22nd IEEE conference on Computer Vision and Pattern Recognition, pp. 142-149, 2009.

* cited by examiner

MULTI-TASK MACHINE LEARNING USING FEATURES BAGGING AND LOCAL RELATEDNESS IN THE INSTANCE SPACE

BACKGROUND

The following relates to the multi-task machine learning arts, classification arts, and so forth, and to arts employing same such as data mining, document indexing and archiving, and so forth.

In applications such as data mining and document archiving, a large quantity of items (e.g., documents) is provided, and various tasks are to be performed by machine learning of suitable classifiers or decision rules. For example, during the discovery phase of a legal dispute it may be necessary for a party to identify documents relevant to various aspects relating to the matter or matters in dispute. Each identification task can be performed by learning a suitable classifier or decision rule via machine learning. (In some applications this may serve as an initial automated "screening" procedure, after which the identified documents are manually reviewed for relevance by appropriate personnel before being turned over to the other side to fulfill discovery requirements).

As another example, in document archiving it is desired to identify the index classifications to which each document belongs. Again, suitable index classification rules may be learned via machine learning and then applied to provide automated indexing of incoming documents for use in archiving.

In these and diverse other applications, the machine learning amounts to multi-task machine learning, where each task corresponds to generating a particular decision rule or classifier for solving a particular task. Thus, for example, each discovery aspect is a task, or each index classification is a task. One approach for performing multi-task machine learning is to learn the rule or classifier for each task independently.

However, if there is common knowledge that is relevant to the different tasks, then it may be desirable to perform "multi-task" machine learning in which the decision rules or classifiers for the various tasks are learned together in a way that leverages the common knowledge. Multi-task machine learning typically assumes that there is some "relatedness" between the different learning tasks, that is, some correlation between the different (but related) tasks as applied in the instance space of interest.

The following sets forth improved methods and apparatuses.

BRIEF DESCRIPTION

In some illustrative embodiments disclosed as illustrative examples herein, an apparatus comprises: a multi-task machine learning component for learning a set of tasks comprising two or more different tasks based on a set of examples wherein the examples are represented by features of a set of features, and an inference component. The multi-task machine learning component comprises a digital processing device configured to learn an ensemble of base rules wherein each base rule is learned for a sub-set of the set of features and comprises a multi-task decision tree (MT-DT) having nodes comprising decision rules for tasks of the set of tasks. The inference component comprises a digital processing device configured to predict a result for at least one task of the set of tasks for an input item represented by features of the set of features using the learned ensemble of base rules.

In some illustrative embodiments disclosed as illustrative examples, in the apparatus of the immediately preceding paragraph the multi-task machine learning component learns each base rule by: (i) learning a decision rule for a task of the set of tasks wherein the learned decision rule defines a node of the MT-DT and the possible outputs of the decision rule define links to child nodes for which the learned node is the parent node, and (ii) recursively repeating the learning (i) for each child node with the set of tasks trimmed to remove the task to which the decision rule of the parent node is directed. The base rule comprises an MT-DT comprising the set of nodes generated by the learning operations (i) and (ii). The recursive repeating (ii) may include (i)(a) learning a decision rule for each task of the trimmed set of tasks and (i)(b) selecting the learned decision rule that minimizes an error metric.

In some illustrative embodiments disclosed as illustrative examples herein, a method is disclosed that operates on a set of examples wherein the examples are represented by features of a set of features. The method comprises: bootstrap aggregating (i.e., bagging) features of the set of features to generate M sub-sets of the set of features defining M feature bags where M is an integer equal to or greater than three; and learning an ensemble of M base rules wherein each base rule is learned for a different feature bag of the M feature bags. The bootstrap aggregating and the learning are suitably performed by a digital processing device. In some embodiments the M feature bags are generated by sampling the set of features M times uniformly and without replacement.

In some illustrative embodiments disclosed as illustrative examples herein, in the method of the immediately preceding paragraph the learning comprises learning, for each feature bag, a base rule comprising a multi-task decision tree (MT-DT) having multi-node paths defining sets of decision rules for different tasks of the set of tasks. In some such embodiments any multi-node path of the MT-DT consisting of N nodes (where N is an integer greater than or equal to one) defines a set of N decision rules for N different tasks of the set of rules.

In some illustrative embodiments disclosed as illustrative examples herein, a storage medium stores instructions executable by a digital processor to perform a method operating on a set of examples wherein the examples are represented by features of a set of features. The method comprises: partitioning the set of examples or the set of features to form M groups where M is an integer greater than or equal to three; generating a base rule comprising a multi-task decision tree by (i) learning a decision rule for a task of the set of tasks using a group of the M groups wherein the learned decision rule defines a node of the multi-task decision tree and the possible outputs of the decision rule define links to child nodes for which the learned node is the parent node and (ii) recursively repeating the learning (i) for each child node with the set of tasks trimmed to remove the task to which the decision rule of the parent node is directed, and repeating the generating for each group of the M groups to generate M base rules; and constructing a multi-task ensemble classifier comprising an ensemble of at least the M base rules. The recursive repeating (ii) may further include trimming the set of examples to remove the portion of the set of examples used in the learning (i). The constructing of the multi-task ensemble classifier may comprise constructing a multi-task ensemble classifier comprising one of (1) a vote by the M base rules and (2) an average of the M base rules.

In some illustrative embodiments disclosed as illustrative examples herein, a storage medium stores instructions executable by a digital processor to predict a result for at least one task of a set of tasks for an input item represented by features of a set of features using an ensemble of base rules wherein each base rule comprises a multi-task decision tree in which: (i) each node comprises a single-task decision rule directed to a single task of the set of tasks; (ii) links between a parent node and its child nodes comprise the possible outputs of the single-task decision rule of the parent node; and (iii) the single task decision rule of each child node is for a different task than the single task decision rule of its parent node. In some such embodiments the ensemble of base rules comprises M multi-task decision trees respectively operating on M different sub-sets of the set of features.

DETAILED DESCRIPTION

Figure 1:
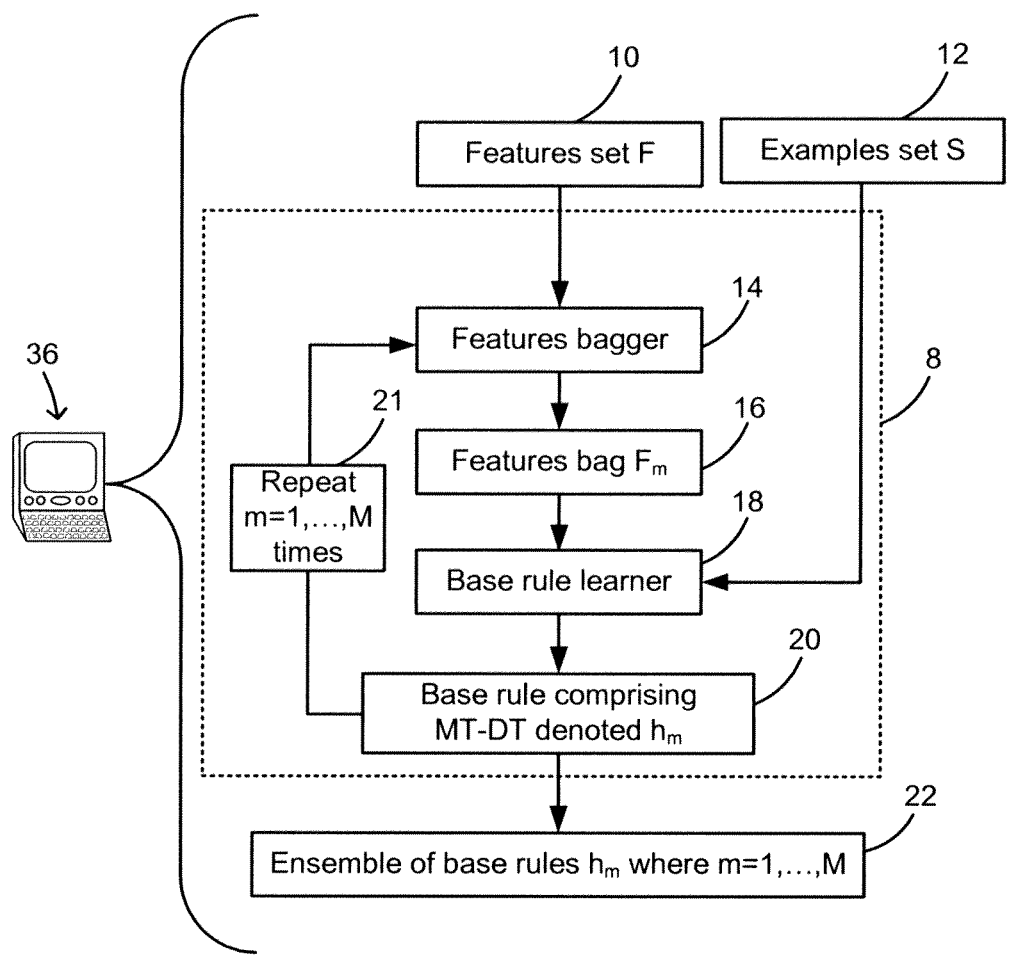
FIG. 1 diagrammatically shows a multi-task machine learning system as disclosed herein.

Multi-task machine learning typically assumes that there is some "relatedness" between the different learning tasks, that is, some correlation between the different (but related) tasks as applied in the instance space of interest. However, it is recognized herein that such a global relatedness assumption can be undesirably strong. For example, two different learning tasks may have strong correlation or relatedness for some regions of the instance space, while having weak correlation or relatedness in other regions of the instance space. Assuming a global relatedness throughout the instance space when that assumption is inappropriate for certain regions is akin to introducing extraneous data noise into those regions.

To overcome this difficulty, it is disclosed herein to employ base learners that reflect relatedness between various tasks in localized regions of the instance space. In general, the approach is as follows. A first decision rule is learned for a first task. Using that rule, the set of examples is divided into groups in which each group has the same classification or label for the first task. This, in effect, divides the instance space into regions defined by a common result (e.g., label) for the first task. Each of these groups or regions is, in turn, processed to learn a rule pertaining to another task different from the first task. If this other task is closely related to the first task having a particular label, then it is expected that the decision rule relating to this other task will be generated with low error for the group having that particular label for the first task. The second task for each group is therefore selected as whichever task (other than the first task) provides the lowest error for the group. The process is recursively performed i.e., each space defined by the first decision rule is again divided now using the second rule, and each spatial group defined by a common label of the second rule is processed to learn a rule for a third task, and so forth. The resulting structure is a decision tree, and is referred to herein as a multi-task decision tree (MT-DT). Traversal of the MT-DT from root to leaf identifies a set of (in general) multi-task labels or results which are biased toward relatedness between tasks in localized regions of the instance space. Traversal of the MT-DT over a path of N nodes identifies N decision rules for N different tasks.

This approach is a type of ensemble learning method, in which numerous weakly performing base rules are learned for a given task by diversifying the data instances (i.e., examples). Here, the base rules are the generated MT-DT. The base rules are combined by a voting or averaging technique in order to generate the final prediction for a task of interest.

To ensure that the ensemble improves over the performance of a single learned rule, the constituent rules of the ensemble should be materially "different", or "diverse". One way of assessing diversity is that diverse base rules should be substantially altered by small data variations. However, in practice it has been found that some machine learning approaches, such as KNN and support vector machine (SVM) algorithms, have low sensitivity to variations in the instance set.

In contrast, it has been found that ensemble learning by diversification of the features set into sub-sets provides more robust diversity of the base rules and consequent better machine learning performance as compared with ensemble learning employing instance diversification. See, e.g. Turner et al., "Classifier combining: Analytical results and implications", in Proceedings of the AAAI-96 Workshop on Integrating Multiple Learned Models for Improving and Scaling Machine Learning Algorithms, pages 126-132 (1995); and Bay, "Combining nearest neighbor classifiers through multiple feature subsets, in Proc. 17th Int'l. Conf. on Machine Learning, pages 37-45 (1998). In view of the foregoing, the multi-task machine learning illustrated herein employ ensemble learning by diversification of features sets. An advantage of this approach is that the ensemble size scales with the size of the features set rather than with the size of the set of examples.

With reference to FIG. 1, an illustrative multi-task machine learning component 8 is shown. The multi-task problem entails finding a result (e.g., prediction, label, or so forth) for a sample respective to two or more tasks. The number of tasks is denoted herein as T, with individual tasks being denoted $t_1, t_2, \ldots, t_T$. (In some contexts herein, the notation T is used to denote the set of tasks, in which case the number of tasks is more properly denoted |T|. However, to simplify notation T is used herein to denote the number of tasks, with |T| being used only where the notation might otherwise be ambiguous). The machine learning component 8 of FIG. 1 is operative on a set of features 10, denoted F, and a set of examples 12, denoted S. To implement diversification of the features set 10, a features bagger 14 performs bootstrap aggregation (i.e., bagging) of the features set 10 to generate a features bag $F_m$ 16. The features of the features set F 10 describe or represent instances (such as the examples 12) in an instance space X. The features set F is sampled M times (uniformly and with replacement) to generate M (possibly overlapping) sub-sets of features denoted $F_1, F_2, \ldots, F_M$, also called "feature bags". This is a bootstrap aggregation (i.e., bagging) approach. The number of feature bags M is chosen based on the amount of diversity desired.

For each feature bag 16, a base rule learner 18 learns a base rule comprising a multi-task decision tree (MT-DT) 20. An iterator 21 invokes the features bagger 14 and base rule learner 18 a total of M times to learn a base rule for each feature bag so as to generate a set (or ensemble 22) of diverse (and multi-task) hypotheses, i.e. M base rules $h_1, h_2, \ldots, h_M$.

Figure 2:
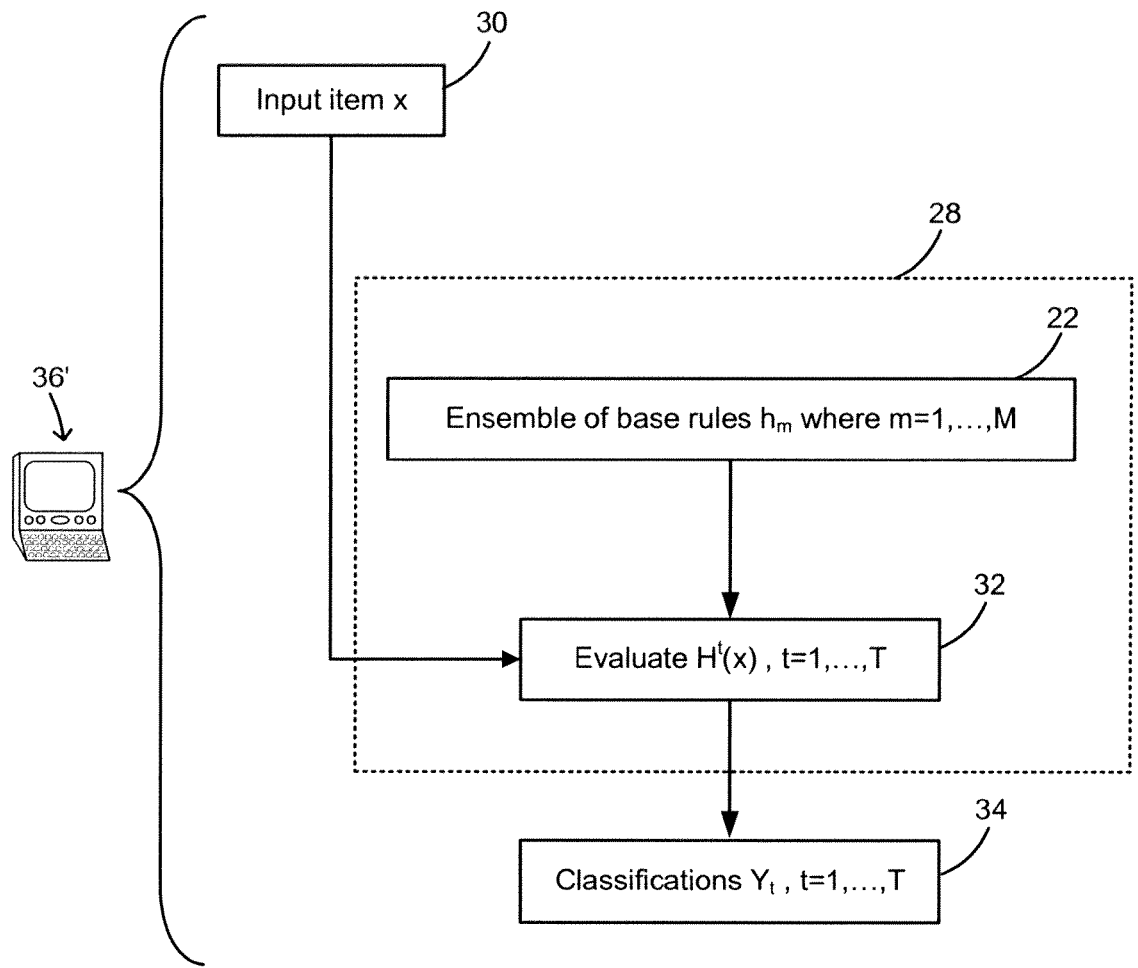
FIG. 2 diagrammatically shows the performance of multiple tasks using the decision rules or classifiers generated by the multi-task machine learning system of FIG. 1.

With reference to FIG. 2, an inference component 28 predicts a result for at least one task of the set of T tasks for an input item x 30 represented by features of the set of features F 10 using the learned ensemble 22 of base rules. In an evaluation or classification operation 32, the predictions of the ensemble 22 for a task t are suitably combined by a majority vote weighted by individual training errors $\epsilon_1$, $\epsilon_2, \ldots, \epsilon_M$, or are combined as an average with error weighting, or so forth, to generate a classification $Y_T$. In the embodiment of FIG. 2 this is repeated for all T tasks to generate a set of classifications (or labels, or predictions, et cetera) $Y_1$, $Y_2, \ldots, Y_T$ 34. However, the classification or prediction can be performed for as few as a single task of the set of T tasks.

The use of feature bagging (as opposed to example or instance bagging) has certain advantages. By sampling the feature set using the features bagger 14, the impact of the "curse of dimensionality" is reduced. Moreover, by training base rules (also suitably called base classifiers) on different feature bags, the diversity the ensemble of base rules 22 is increased. When the base rule is robust to small data change (like SVMs), the increase in diversity obtained by feature bagging is expected to be more important than the increase obtainable by examples—bagging or boosting.

The multi-task machine learning component 8 of FIG. 1, and the inference component 28 of FIG. 2, are suitably implemented by a digital processing device such as an illustrative computer, or another digital processing device such as a "smartphone", personal data assistant (PDA), network server computer, graphical processing unit (GPU), or so forth. In the illustrative embodiment, a computer 36 implements the learning component 8 of FIG. 1 while a computer 36' implements the inference component 28 of FIG. 2. The computer 36' may be different a different computer from the computer 36, or both computers 36, 36' may be the same computer. (Said another way, the learning may be performed on one digital processing device and the resulting base rules ensemble 22 transferred to another computer that performs the inference; or, alternatively, the same computer can perform both the learning and inference).

The multi-task machine learning component of FIG. 1, and the inference component of FIG. 2, can also be implemented as a non-transitory storage medium storing software, firmware, or other instructions executable by the illustrative computer 36 (and/or computer 36') or another digital processing device to implement the disclosed multi-task machine learning and/or inference processing. The non-transitory storage medium may, by way of illustrative example, include one or more of: a hard drive or other magnetic medium, or an electronic storage medium such random access memory (RAM), flash memory, or so forth, or an optical disk or other optical memory, a redundant array of independent disks (RAID) providing storage for a network server or other network-connected digital processing device, or so forth.

With returning reference to FIG. 1, the illustrative base rule learner 18 generates the base rule 20 in the form of multi-task decision tree (MT-DT) structure. The MT-DT generated by the illustrative base rule learner 18 has the following properties: (i) each node comprises a single task decision rule directed to a single task of the set of tasks; (ii) links between a parent node and its child nodes comprise the possible outputs of the single task decision rule of the parent node; and (iii) the single task decision rule of each child node is for a different task than the single task decision rule of its parent node. A consequence of this structure is that, if a path of length N nodes is traversed in the MT-DT, the path will traverse N different single-task decision rules respectively pertaining to N different tasks.

The MT-DT are constructed to capture different degrees of task relatedness across the different regions of the space X. For T tasks, the MT-DT generated by the base rules learner 20 has T levels. The first level is the root node. In the case of a binary classifier, the root node is suitably a single-task decision rule having the form of a linear separator w·x+b for one of the tasks. The second level includes two prediction nodes defined by a decision rule for another task (different from the task to which the root node is directed), and so on. In this example the tasks are assumed be binary classification tasks having two possible outputs (e.g., "Yes" or "No", "accept" or "reject", or so forth). More generally, a task may have two, three, or more possible outputs. The MT-DT produces a hierarchical partition of the instance space.

With continuing reference to FIG. 1, the base rule learner 18 is applied M times to learn the ensemble 22 of multi-task weak hypotheses represented by MT-DT structures. A multi-task hypothesis is a function $H: X \rightarrow Y_1 x \ldots x Y_T$, where X is the feature space and $Y_t$ is the label set for task t. For an instance $x \epsilon X$, H outputs T labels, i.e. one label for each task. In traversing the MT-DT having T levels, one of these labels is generated by the single-task decision rule of each node, so that by traversing all T levels of the MT-DT from the root node to a leaf node all T labels are generated.

In an illustrative embodiment, the multi-task machine learning component 8 suitably implements Algorithm 1 set forth below.

---
Algorithm 1
Require: M, S, Learn-MT-DT, Err and Sample

1: for m = 1 to M do
2:    $F_m$ = Sample(F)
3:    $h_m$ = Learn-MT-DT(S, $F_m$) {train the base learner}
4:    $\epsilon_m$ = Err($h_m$, S) {calculate the error}
5:    
$$\text{if } \epsilon_m > \frac{1}{T} \sum_{t=1}^{T} \left( \frac{|C_t| - 1}{|C_t|} \right) \text{ then}$$

6:        {Worse than random}
7:        Continue
8:    else
9:        Add $h_m$ to the ensemble
10:   end if
11: end for
12: return A classifier $H: X \rightarrow Y_1 \times \ldots \times Y_T$.

---

Algorithm 1 receives two inputs: the number of feature bags M and the set of examples S 12. Algorithm 1 also calls three functions: Learn-MT-DT; Err; and Sample. The function Learn-MT-DT corresponds to the base rule learner 18 of FIG. 1. An MT-DT for an iteration m is denoted $h_m(x)$, and its output (projection) for task t is $h_m'(x)$. The function Err is a function that calculates the error of an MT-DT with respect to the set of examples S 12. The function Sample performs the bootstrap aggregation (bagging) of the set of features F 10 to generate the feature bag $F_m$, and thus corresponds to the feature bagger 14 of the machine learning component 8 of FIG. 1.

Algorithm 1 performs M iterations (line 1). At iteration m, Algorithm 1 samples the feature set F 10 to generate the feature bag $F_m$ (line 2) and calls Learn-MT-DT on S and $F_m$ to learn a base rule comprising an MT-DT, denoted as $h_m$ (line 3). If $h_m$ predicts the labels of the set of examples S 12 better than a random guesser (assessment made at lines 4-8) then $h_m$ is retained in the ensemble 22 (line 9); otherwise, $h_m$ is discarded. After M iterations of the loop (lines 1-11), Algorithm 1 returns the final classifier $H: X \rightarrow Y_1 x \ldots x Y_T$ comprising the ensemble 22 of at most M base rules comprising MT-DT structures (line 12).

Once the ensemble 22 of base rules has been generated as per Algorithm 1, it can be used by the inference component 28 (FIG. 2) to infer a prediction (or label or classification or so forth) for a task t of the set of T tasks applied to input item x 30 represented by features of the set of features F 10. A suitable approach for this evaluation operation 32 is to employ a weighted sum of all MT-DT outputs for the task t according to the expression $$H^t(x) = \text{argmax}_{c \in C_t} \sum_{m:h^t_m(x)=c} \frac{1}{\epsilon_m}.$$

A suitable embodiment of function Learn-MT-DT is set forth as Algorithm 2, which receives as input the set of tasks T and the set of examples S 12.

```
Algorithm 2 Learn-MT-DT( T, S)
Require: Divide, Err, learn-single-task
 1: if |T| == 1 then
 2:     {recursion stopping condition}
 3:     return learn-single-task(S)
 4: else
 5:     for t = 1 to T do
 6:         h_t = learn-single-task(S_t)
 7:         ∈_t = err(h_t)
 8:     end for
 9:     t* = argmin_{t∈{1...T}}(∈_t)
10:     S = S\S_t* {remove the task that has been learned}
11:     T = T\t*
12:     (S_1,...,S_{|C_t*|}) = Divide(S, h_t*) {divide the in-
           stances of the remaining tasks according to their
           predicted classes by h_t*}
13:     node = h_t* {h_t* will be a node in the MT-DT}
14:     for c = 1 to C_t* do
15:         node.children[c] =Learn-MT-DT(T,S_c)
16:     end for
17: end if
18: return node
```

Although not explicitly shown in either Algorithm 1 or Algorithm 2, it is assumed that the set of examples S 12 is partitioned into T test groups $S_1, S_2, \ldots, S_T$ (where $S=S_1 \cup S_2 \cup \ldots S_T$). Moreover, the feature bagging has already been done (as per bagging operation 14 in FIG. 1, or equivalently as per Algorithm 1 line 2), and so the features bag $F_m$ is available and the MT-DT is trained only for this sub-set of the features set F 10. The learning of the MT-DT is performed recursively through the T tasks, with Algorithm 2 lines 1-3 providing the recursion termination. In the first iteration, T is greater than one (i.e., T is initially the total number of tasks in the multi-task problem). Thus, the termination test at lines 1-3 is bypassed and processing passes to lines 5-8 which learns a single-task classifier $h_t$ for each task $t=1, \ldots, T$. In the learning process of lines 5-8 the set of examples S 12 is assumed to be partitioned into T test groups $S_1, S_2, \ldots, S_T$ (where $S=S_1 \cup S_2 \cup \ldots S_T$), and each single-task classifier $h_t$ is trained on a corresponding partition $S_t$. Moreover, the training employs only the features bag $F_m$ for characterizing the examples. At line 6 the classifier $h_t$ is trained using a function learn-single-task. In a suitable embodiment employing binary classifiers, the function learn-single-task learns a linear separator of the form $w \cdot x + b$ for the task t on the set partition $S_t$. In one suitable approach, a decision stumps learner is used to learn the linear separator. More generally, however, the function learn-single-task can learn any type of single-task classifier using any learning method suitable for that type of classifier. At line 7 an error function err assesses the error of $h_t$ with respect to the partition set of examples $S_t$, or alternatively with respect to the whole set of examples S.

At Algorithm 2 line 9, the "best" single-task classifier $h_t$ is selected, and more particularly the corresponding task t is selected. These "best" values are denoted as best classifier $h_t^*$ and corresponding task $t^*$. In line 10 the set of examples S is trimmed by removing the samples partition $S_t^*$, and in line 11 the set of tasks T is trimmed by removing the selected task $t^*$. The example trimming of line 10 may optionally be omitted.

In lines 12 and 13 the tree expansion is performed. Line 13 adds a learned node comprising the single-task classifier $h_t^*$ to the MT-DT, while line 12 defines links to child nodes for which the learned node is the parent node. A link to a child node is added for each possible result or output of the classifier $h_t^*$. The notation $C_t$ denotes the set of classes for task t. Accordingly, the line 12 adds $|C_t^*|$ child links off of the learned node comprising $h_t^*$. This operation uses a function Divide that partitions the data set S into $|C_t^*|$ partitions according to predictions of the single-task classifier $h_t^*$ with respect to the task $t^*$. Each partition contains all examples of S having the corresponding classification (i.e., prediction) value output by $h_t^*$. Algorithm 2 lines 14-16 recursively build the nodes of the multi-task decision tree by repeating the processing for each of the child nodes.

Thus, in sum, the operation of the function Learn-MT-DT builds the base rule comprising an MT-DT as follows. In a learning operation (i) corresponding to Algorithm 2 lines 5-13, a decision rule $h_t^*$ is learned for a task $t^*$ of the set of tasks T (lines 5-9) wherein the learned decision rule $h_t^*$ defines a node of the MT-DT (line 13) and the possible outputs of the decision rule define links to child nodes for which the learned node is the parent node (line 12). In an operation (ii) corresponding to Algorithm 2 lines 10-11 and 14-16 the learning operation (i) is recursively repeated for each child node (lines 14-16) with the set of tasks trimmed to remove the task to which the decision rule of the parent node is directed (line 11). The learned base rule then comprises an MT-DT comprising the set of nodes generated by the learning operations (i) and (ii).

Figure 3:
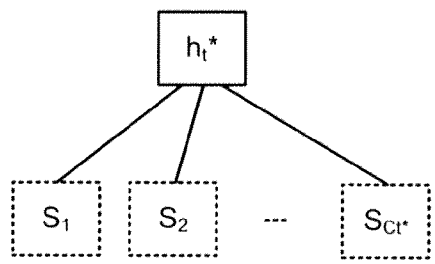
FIGS. 3 and 4 diagrammatically show first and second expansion stages, respectively, for generating a multi-task decision tree (MT-DT) as part of the machine learning performed by the system of FIG. 1.
Figure 4:
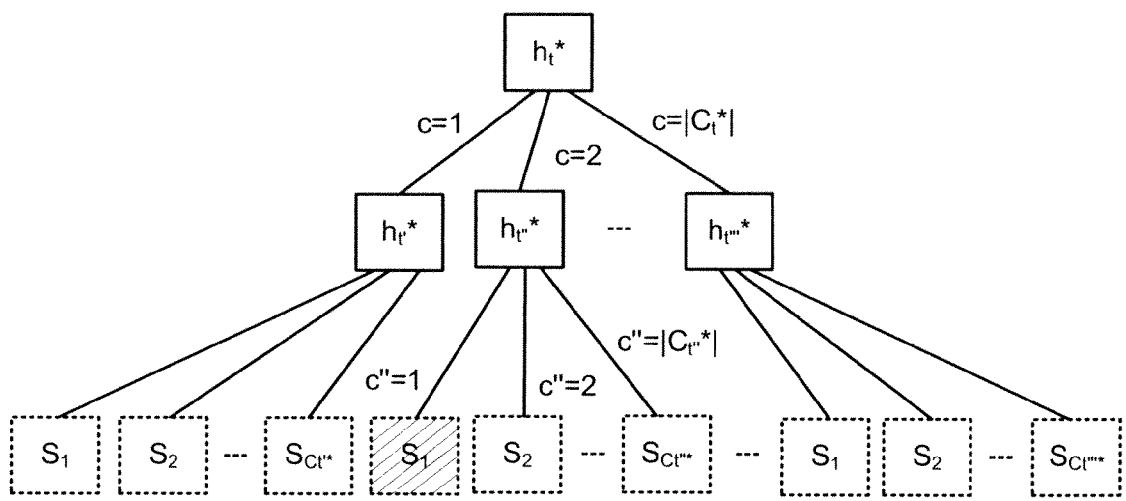

With reference to FIGS. 3 and 4, two stages of the operation of the function Learn-MT-DT is diagrammatically shown. FIG. 3 shows the output of the first iteration of the learning operation (i), including the learned node comprising $h_t^*$ (which will be the root node of the MT-DT since this is the first iteration) and the links to child nodes $S_1, S_2, \ldots, S_{C_t^*}$. Note that these spatial partitions for the child nodes are regions of the instance space X defined by the single-task classifier $h_t^*$ (Algorithm 2 line 12). Thus, in FIG. 3 $S_1$ denotes the partition of instance space X for which $h_t^*$ has the first classification value, $S_2$ denotes the partition of instance space X for which $h_t^*$ has the second classification value, and so forth until $S_{C_t^*}$ denotes the partition of instance space X for which $h_t^*$ has the $C_t^{*-th}$ classification value.

FIG. 4 then shows the result for the second iteration, in which the child nodes are assigned classification functions $h_{t'}^*, h_{t''}^*, \ldots, h_{t'''}^*$ where t', t'', t''' denote tasks other than $t^*$ (since $t^*$ was excluded by the tasks trimming operation of Algorithm 2 line 11). It should be noted that while none of t', t'', t''' are the same as $t^*$, it is possible for t'=t'' or t'=t''' or t''=t''' or t'=t''=t'''.

With particular reference to the middle branch of the expanding MT-DT shown in FIG. 4, another aspect is described. The link corresponding to classification c''=1 is shown shaded in FIG. 4. This diagrammatically illustrates a possible result in which the function Divide (line 12) finds no examples in S having the corresponding classification value (e.g., no examples with classification value c''=1 assigned by $h_{t''}^*$ in the illustrative case). In this case, the MT-DT cannot expand further below this "null" node, and as a consequence the learned base rule comprising the MT-DT of FIGS. 3 and 4 cannot generate a meaningful prediction for the tasks along that path that "would have" been located below the "null" node. This situation is suitably addressed by defining the MT-DT as "abstaining" from predicting labels in that case.

Such abstention should be accounted for in the implementation of the error function Err used in Algorithm 1. A suitable function Err is as follows. Given the T tasks and the base rule $h_m$, a sub-set $T_{m,\,abstain}$ is defined as those tasks for which the base rule $h_m$ abstains from making a prediction. That is, s.t.$\exists x \in X$, $t \in T$:$h^t(x)$=Abstain. For base rule $h_m$ at feature bagging iteration m, the following quantities are defined: $W_-^t$ given by:

$$W_-^t = \sum_{(x,y)\in S_t; h^t(x)\neq y} 1$$

which is the number of instances of task t which are misclassified by the base rule $h_m$; and $W_0^t$ given by:

$$W_0^t = \sum_{(x,y)\in S_t; h^t(x)=Abstain} 1$$

which is the number of instances of task t on which the base rule $h_m$ abstains from predicting a value. With these quantities defined, the empirical error for the base rule $h_m$ accounting for both mis-classified and abstained instances is defined as follows:

$$\epsilon = \frac{1}{T}\sum_{t=1}^{T}\left(\frac{1}{|S_t|}\left(W_- + \frac{|C_t|-1}{|C_t|}\cdot W_0\right)\right)$$

where $$\frac{|C_t|-1}{|C_t|}$$

represents the fraction of $W_0^t$ that will be mis-classified by a random selection of one of the $|C_t|$ classes available for the task t.

In the illustrative embodiment, the ensemble 22 of base rules includes only base rules comprising MT-DT which are all multi-task base rules. However, to give more freedom to each task to capture its specific patterns, one or more single-task base rules may optionally be added to these multi-task base rules. A single-task base rule for a task t is suitably learned on a training set $S_t$. Any such single-class base rule abstains when asked about any other class, e.g. the single class base rule for a task t abstains when asked about any task other than task t.

The size of the MT-DT can grow exponentially with the number of tasks, such that learning becomes expensive with large number of tasks. To address this problem an approach for multi-class classification known as One-Against-One can be employed, but applied between tasks rather than between classes. At each iteration an MT-DT is learned for each pair of tasks (that is, a "bi-task tree" is learned) which will have three nodes and two levels. Such a bi-task tree will abstain when asked about other tasks.

Another contemplated approach for addressing uncontrolled growth of the learning with large number of tasks is to artificially "truncate" the MT-DT. For example, rather than growing the MT-DT to its full size of T levels corresponding to the T tasks of the multi-task problem, the MT-DT may be grown to a size of less than T levels. This approach reduces the learning expense, but at the trade-off that the truncated MT-DT will more frequently abstain from making predictions (since any MT-DT whose path terminates before reaching a task t of interest must abstain).

The disclosed multi-task classification techniques have been applied to two datasets: an "Enron" dataset and a "Tobacco" dataset. This simulates application of the disclosed multi-task classification to the discovery phase of a legal dispute. A discovery request in a lawsuit involving companies and/or individuals can entail assessment of large collections of documents such as hard copy official documents, electronic mail (email) documents, and so forth. Lawyers representing the opposing parties are engaged to mine those document collections (which may comprise millions of documents in litigation involving large corporate, government, or non-profit entities) in order to decide which documents are responsive to the discovery request and must be turned over to the opposing party. Case mining is costly and time consuming, and calls for reasonable accuracy since a single document may have a considerable impact on the lawsuit, and failure to turn over a responsive document can have adverse consequences. A document discovery task has been simulated on two existing publicly available datasets: the "Enron" dataset and the "Tobacco" dataset.

The Enron dataset (available at http://www.cs.cmu.edu/~enron/, last accessed Apr. 14, 2011) contains all e-mails sent and received by about 150 accounts of the top management of the (now defunct) Enron Corporation and spanning a period of several years. The total number of messages is about 250,000. The Enron dataset encompasses a wide variety of subjects ranging from business related topics to personal messages.

The Tobacco dataset is based on documents released under the tobacco Master Settlement Agreement" (MSA), which settled a range of lawsuits by the Attorneys General of several states of the United States against five tobacco companies and two tobacco research institutes. These documents reside at a permanent repository called the Legacy Tobacco Documents Library (LTDL) maintained at the University of California San Francisco (UCSF) Library with support from the American Legacy Foundation. The collection is based on a snapshot, generated between November 2005 and January 2006, of the MSA sub-collection of the LTDL. The snapshot consisted of 1.5 TB of scanned document images, as well as metadata records and Optical Character Recognition (OCR) produced from the images by UCSF. After reformatting OCR and metadata; and filtering documents with formatting problems; the collection consists of 6,910,192 document records in the form of extended markup language (XML) elements.

These datasets were preprocessed as follows. Annotations of the Enron dataset come from two different sources. The first is from the Department Of Justice of the United States DOJ (available at http://www.usdoj.gov/enron/, last accessed Apr. 14, 2011), which has published a list of responsive emails used in two trials relating to the Enron matter. This set along with a manually annotated non-responsive emails constitute a binary classification task T1: Responsive Vs. Non-responsive, with total of 372 emails. The second annotated set comes from students of Berkeley University. Emails in this set are annotated by topic, for an average of 250 emails per topic. Four topics were considered in the simulated multi-task problem: Business, Legal, Arrangement, and Personal. Since the two sets are small, and they share some common knowledge (for example, a personal email is not likely to be a responsive email), it follows that learning the tasks concurrently simultaneously by multi-task machine learning would be advantageous. Note that these two datasets are disjoint, that is, there are no examples provided with both annotations. The multi-task problem included the following tasks: T1: Responsive Vs. Non-responsive; T2: Legal Vs. Personal; and T3: Business Vs. Arrangement.

The documents of the Enron dataset are multi-modal. They have textual information and implicit social information derived from the underlying social network which is composed users connected through their email communications. The set of features included 2200 textual features, each of which represents a cluster of semantically similar words (for example, one cluster includes the semantically similar words "trip", "journey", and "travel"). The value of such a textual feature was computed as the number of times words of the cluster occurred in a given document. In addition to textual features, a set of commonly used features was extracted to represent key properties of actors. See Hovelynck et al., "Multi-modality in one-class classification", In WWW '10: Proceedings of the 19th Intl Conf. on World Wide Web, pages 441-450 (2010). To translate the properties of actors to properties of e-mails, a set of 37 features was constructed to represent each email message. A message is represented by three sets of 12 features: (1) the properties of the sender; (2) the average of the properties of all receivers; and (3) the properties of the most prominent receiver (i.e. with the highest social score). The set of features also included the number of receivers as an additional feature.

Preprocessing of the Tobacco dataset was as follows. Each document is annotated by multiple labels. In total there are 70 possible labels with an average of 10,000 documents per label. To construct a multi-task problem pertaining to the multi-label, four labels were chosen and two binary tasks were constructed from the documents: T1: Smoking and lung cancer Vs. Marketing Strategy; and T2: Nicotine and addiction Vs. Advertisements. It is noted that each chosen document has one and only one of the four labels, i.e., there is no intersection between tasks' documents. For the Tobacco dataset, each document is represented by bag-of-words features vector having 40200 distinct words. For each word the feature vector element has value 1 if the word exists in the document and has value 0 otherwise.

To evaluate the performance of disclosed multi-task (MT) classification approach (employing the embodiment of Algorithms 1 and 2), comparison was made with MT-Adaboost (Faddoul et al., "Boosting multi-task weak learners with applications to textual and social data", in Int'l. Conf. on Machine Learning and Applications, ICMLA 2010, Washington D.C., USA, Dec. 12-14, 2010; Freund et al., "A short introduction to boosting", Japanese Society for Artificial Intelligence", vol. 14 no. 5 pages 771-780, 1999), single-task Adaboost, and support vector machines (SVMs) bagging with bagging performed on either features or examples. To run SVMs the LibLinear software (available at http://www.csie.ntu.edu.tw/~cjlin/liblinear/, Apr. 14, 2011) was used. LibLinear is an SVM implementation with linear kernel. Adaboost was used with decisions stumps. The MT-bagging, single-task bagging, Adaboost, and MT-Adaboost approaches share one parameter, namely the size of the ensemble M, which was set to M=100 for these approaches. MT-Bagging and Bagging have another common parameter, namely the size of the sample (examples or features sample)—this was set to the same size as the original training sample, whereas, features sample is 70% as big as the original features' size.

These tests on the Enron and Tobacco datasets showed generally improved classification performance for the approach of Algorithms 1 and 2 as compared with the comparison MT-bagging, single-task bagging, Adaboost, and MT-Adaboost approaches. Moreover, generally improved diversity (as measured using an entropy measure under the assumption that the diversity is highest if one-half of the classifiers are correct) was observed for base rules generated using features bagging as compared with base rules generated using examples bagging, both when using Algorithms 1 and 2 (with the function Sample of Algorithm 1 line 1 modified to perform examples bagging in the comparative latter tests) and when using the comparative MT approaches. This demonstrates improved diversity performance of features bagging as compared with examples bagging which was observed for different classification techniques.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
a multi-task machine learning component for learning a set of T tasks, where T is greater than or equal to three, based on a set of examples wherein the examples are represented by features of a set of features, the multi-task machine learning component comprising a digital processing device configured to bootstrap aggregate features of the set of features by sampling the set of features M times uniformly and with replacement to generate M possibly overlapping sub-sets of the set of features defining M feature bags where M is an integer equal to or greater than two and learn an ensemble of M base rules wherein each base rule is learned for a different one of the M feature bags and comprises a multi-task decision tree (MT-DT) having nodes comprising decision rules for tasks of the set of tasks, wherein the multi-task machine learning component learns each base rule by:
  (i) learning a decision rule for a task of the set of T tasks wherein the learned decision rule defines a node of the MT-DT and the possible outputs of the decision rule define links to child nodes for which the learned node is the parent node, and
  (ii) recursively repeating the learning (i) for each child node with the set of T tasks trimmed to remove the task to which the decision rule of the parent node is directed,
  wherein the base rule is an MT-DT with T levels corresponding to the T tasks comprising the set of nodes generated by the learning operations (i) and (ii); and
an inference component comprising a digital processing device configured to predict a result for at least one task of the set of tasks for an input item represented by features of the set of features using the learned ensemble of base rules.

2. The apparatus of claim 1, wherein the learning (i) is performed for a portion of the set of examples and the recursive repeating (ii) further includes trimming the set of examples to remove that portion of the set of examples used in the learning (i).

3. The apparatus of claim 1, wherein the recursive repeating (ii) includes (i)(a) learning a decision rule for each task of the trimmed set of tasks and (i)(b) selecting the learned decision rule that minimizes an error metric.

4. The apparatus of claim 1, wherein the inference component is configured to predict a result for at least one task of the set of tasks using a voting or averaging algorithm employing the base rules of the learned ensemble of base rules.

5. A method operating on a set of examples wherein the examples are represented by features of a set of features, the method comprising:
- sampling the set of features to generate a sub-set of the set of features
- learning a base rule comprising a multi-task decision tree (MT-DT) having multi-node paths defining sets of decision rules for different tasks of a set of tasks in order to learn a base rule wherein the base rule is learned for the sub-set of the set of features;
- repeating the sampling and the learning M times where M is an integer equal to or greater than three in order to learn an ensemble of M base rules each comprising a MT-DT; and
- predicting a result for a plurality of tasks of the set of tasks for an input item represented by features of the set of features using the learned ensemble of M base rules;
- wherein the sampling and the learning are performed by a digital processing device and the predicting is performed by one of (1) the same digital processing device that performs the sampling and the learning and (2) a digital processing device different from the digital processing device that performs the bootstrap aggregating and the learning.

6. The method of claim 5, wherein any multi-node path of the MT-DT consisting of N nodes defines a set of N decision rules for N different tasks of the set of rules, where N is an integer greater than or equal to three.

7. The method of claim 5, wherein the learning comprises:
- learning the multi-task decision tree for bags the sub-set of the set of features by:
  (i) learning a decision rule for a task of the set of tasks wherein the learned decision rule defines a node of the multi-task decision tree and the possible outputs of the decision rule define links to child nodes for which the learned node is the parent node, and
  (ii) recursively repeating the learning (i) for each child node with the set of tasks trimmed to remove the task to which the decision rule of the parent node is directed.

8. A non-transitory storage medium storing instructions executable by a digital processor to perform a method operating on a set of examples wherein the examples are represented by features of a set of features, the method comprising:
- sampling the set of features M times to form M feature groups where M is an integer greater than or equal to three;
- generating a base rule comprising a multi-task decision tree (MT-DT) for T tasks where T is greater than or equal to three by:
  (i) learning a decision rule for a task of the set of T tasks using a feature group of the M feature groups wherein the learned decision rule defines a node of the multi-task decision tree and the possible outputs of the decision rule define links to child nodes for which the learned node is the parent node, and
  (ii) recursively repeating the learning (i) for each child node with the set of tasks trimmed to remove the task to which the decision rule of the parent node is directed wherein the recursive repeating is performed to generate the MT-DT with T levels with each level corresponding to a different task of the T tasks, and
- repeating the generating for each feature group of the M feature groups to generate M base rules each comprising a MT-DT with T levels; and
- constructing a multi-task ensemble classifier comprising an ensemble of at least the M base rules each comprising a MT-DT with T levels.

9. The non-transitory storage medium of claim 8, wherein the recursive repeating (ii) further includes trimming the set of examples to remove the portion of the set of examples used in the learning (i).

10. The non-transitory storage medium of claim 8, wherein the constructing of the multi-task ensemble classifier comprises:
- constructing a multi-task ensemble classifier comprising one of (1) a vote by the M base rules and (2) an average of the M base rules.

* * * * *